(12) United States Patent
Sarikaya et al.

(10) Patent No.: US 7,623,876 B2
(45) Date of Patent: Nov. 24, 2009

(54) APPARATUS, AND AN ASSOCIATED METHOD, FOR PERFORMING LINK LAYER PAGING OF A MOBILE STATION OPERABLE IN A RADIO COMMUNICATION SYSTEM

(75) Inventors: Behcet Sarikaya, Plano, TX (US); Timucin Ozugur, Garland, TX (US)

(73) Assignee: Alcatel Lucent, Paris (FR)

( * ) Notice: Subject to any disclaimer, the term of this patent is extended or adjusted under 35 U.S.C. 154(b) by 1160 days.

(21) Appl. No.: 10/640,000

(22) Filed: Aug. 13, 2003

(65) Prior Publication Data
US 2005/0036510 A1 Feb. 17, 2005

(51) Int. Cl.
*H04W 24/00* (2006.01)
(52) U.S. Cl. ............. 455/458; 455/461; 455/456.5
(58) Field of Classification Search .......... 455/404.2, 455/436.2, 436.3, 404.1, 458, 461, 456.1, 455/456.6
See application file for complete search history.

(56) References Cited

U.S. PATENT DOCUMENTS

| | | | | |
|---|---|---|---|---|
| 5,613,199 A * | 3/1997 | Yahagi | ................ | 455/426.1 |
| 5,832,381 A * | 11/1998 | Kauppi | ................ | 455/432.1 |
| 6,058,308 A | 5/2000 | Kallin et al. | | |
| 6,785,552 B2 * | 8/2004 | Shinozaki et al. | ........ | 455/456.1 |
| 6,834,191 B2 * | 12/2004 | Wallentin et al. | ........... | 455/442 |
| 7,164,926 B2 * | 1/2007 | Papadimitriou et al. | ...... | 455/458 |
| 7,236,764 B2 * | 6/2007 | Zhang et al. | ................ | 455/346 |
| 2003/0076814 A1 * | 4/2003 | Gurivireddy et al. | ........ | 370/352 |
| 2004/0002343 A1 * | 1/2004 | Brauel et al. | ............. | 455/456.1 |
| 2004/0082312 A1 * | 4/2004 | O'Neill et al. | ............... | 455/405 |
| 2004/0254980 A1 * | 12/2004 | Motegi et al. | ............... | 709/203 |
| 2006/0025161 A1 * | 2/2006 | Funato et al. | ............... | 455/458 |

FOREIGN PATENT DOCUMENTS

| | | |
|---|---|---|
| EP | 1304835 A2 | 4/2003 |
| WO | 9407337 A1 | 3/1994 |

OTHER PUBLICATIONS

IEEE Standards; 802.11F; IEEE Trial-Use Recommended Practice for Multi-Vendor Access Point Interoperability via an Inter-Access Point Protocol Across Distribution Systems Supporting IEEE 802.11 Operation; 2003; pp. i-67.

* cited by examiner

*Primary Examiner*—Temica M Beamer
*Assistant Examiner*—Joy K Contee
(74) *Attorney, Agent, or Firm*—Garlick, Harrison & Markison, LLP

(57) ABSTRACT

Apparatus, and an associated method, for paging a mobile station operable in a WLAN. Logical layer-2 paging is provided pursuant to a tracking agent protocol. A tracking agent is provided that tracks the location at a logical layer-2 logical level. A paging cache is maintained that identifies logical layer-2 paging areas in which the mobile station is most recently associated. When a communication session is initiated, a page is broadcast throughout the layer-2 logical layer paging area in which the mobile station is indicated to be positioned.

20 Claims, 3 Drawing Sheets

APPARATUS, AND AN ASSOCIATED METHOD, FOR PERFORMING LINK LAYER PAGING OF A MOBILE STATION OPERABLE IN A RADIO COMMUNICATION SYSTEM

The present invention relates generally to a manner by which to page a mobile station operable in a radio communication system, such as a WLAN (Wireless Local Area Network) that utilizes an IEEE 802.11 operating protocol. More particularly, the present invention relates to apparatus, and an associated method, by which to perform paging at a logical layer beneath an IP (Internet Protocol), or layer-3, logical layer.

The mobile station is paged at the layer-2 logical layer in a manner that permits a dormant mobile station to detect the page. And, the positioning of the mobile station is tracked, and the page is broadcast throughout an area in which the mobile station is last-known to have been positioned. Paging is performed thereby in an efficient manner, minimizing system resources required by which to perform the paging of the mobile station. A tracking agent provides for an interface between layer-3 paging and the layer-2 logical layer. The tracking agent tracks the positioning of the mobile station in terms of a link layer, or layer-2, logical layer. When a mobile station is to be paged, the position, ascertained by the tracking agent, of the mobile station is used to determine throughout which areas that the page is to be broadcast. Layer-2 paging of the mobile station is performed to page the mobile station to permit formation of a communication session therewith.

BACKGROUND OF THE INVENTION

Modern society requires the availability of communication systems through which to communicate data. Data is communicated pursuant to effectuation of many varied types of communication services.

A communication system is formed of, at a minimum, a sending station and a receiving station interconnected by way of a communication channel. Data is originated, at one of the communication stations, forming a sending station. The sending station sends the data upon the communication channel to a second communication station, forming a receiving station. The receiving station detects the data communicated thereto upon the communication channel and operates to recover the informational content thereof.

Many different types of communication systems have been developed and deployed by which to provide for the effectuation of many different types of communication services. With continued advancements in communication technologies, improvements to communication systems are provided, and new types of communication systems are developed and deployed. For instance, advancements in communication technologies have permitted the introduction of new types of radio communication systems and, also, improvements to the capabilities and performance of existing radio communication systems.

In a radio communication system, communication stations are not connected by way of a wireline connection upon which a communication channel is defined. Rather, a communication channel is defined upon a radio air interface extending between the communication stations. Because the need for use of a wireline connection between the communication stations is obviated, radio communication systems provide various advantages over their wireline counterparts. For example, the initial installation and deployment costs associated with a radio communication system are generally less than, sometimes substantially so, than the costs required initially to install and deploy a corresponding wireline communication system. Additionally, and significantly, a radio communication system is amenable for implementation as a mobile communication system. In a mobile communication system, one, or more, of the communication stations operable therein are mobile, thereby providing communication mobility.

A cellular communication system is a type of radio communication system. The network infrastructures of various types of cellular communication systems have been deployed throughout significant portions of the populated areas of the world. Usage levels of cellular communication systems are increasing, and the types of communication services available for effectuation therethrough correspondingly are increasing.

Analog communication techniques are utilized in first-installed cellular communication systems. Such communication systems provide for circuit switched connections. And, circuit switched voice communications as well as low bandwidth data communication services are provided in these cellular communication systems.

Advancements in communication technologies, as noted above, have permitted the development, installation, and deployment of successive generations of cellular communication systems. The successor generation systems, successors to the initially deployed cellular communication systems, generally utilized digital communication techniques and provide for packet switched communications. Packet switched connections in which packet formatted data is communicated efficiently utilizes communication capacity of the communication system. Multiple increases in the communication capacity of a communication system utilizing packet switched communication techniques, relative to communication systems that utilize analog communication techniques are sometimes possible. An operating specification defining the operational parameters and requirements of a universal mobile telephone service/general packet radio service (UMTS/GPRS) communication system is undergoing standardization procedures. The communication system defined therein is an exemplary successor generation cellular communication system that provides for packet switched communications.

Other radio communication systems provide for the effectuation of communication services that are analogous to communication services provided by cellular communication systems. WLANs (Wireless Local Area Networks) also provide for the communication of data with mobile stations by way of radio communication channels. WLANs, also analogous to their wired counterparts LANs (Local Area Networks), provide for data communication services over, typically, relatively small areas, such as throughout a building location or area. WLANs, generally, permit the effectuation of high data rate communication services, sometimes at costs that are substantially lower than the corresponding costs to communicate the corresponding data in a public access, cellular communication system.

Some WLANs are implemented to be operable in compliance with the operating specifications and protocols set forth in an IEEE 802.11, or variant, operating specification. Existing operating standards provide for high bandwidth communication services, e.g., between 11 and 54 Mbps within relatively small coverage areas, such as sixty square meters. Existing WLANs, including those operable pursuant to the IEEE 802.11 operating specification, generally lack an adequate paging mechanism by which to page a mobile station of initiation of a communication session. Existing paging mechanisms are lacking as location tracking of mobile stations operable in such WLANs is not provided. While proposals have been set forth by which to provide layer-3 logical layer paging protocols, e.g., at the IP (Internet Protocol) for IPv4 and Ipv6 protocols, such proposals do not set forth efficient paging procedures. Such proposals provide for layer-3 logical paging services on top of session continuity or merely paging services. The existing proposals do not provide layer-2 logical layer paging, e.g, at the link layer.

Link layer support is needed to locate or track a mobile station and to wake up a dormant mobile station. Paging at the layer-3 logical layer fails to provide an adequate mechanism by which to wake up a dormant mobile station or a mechanism by which to page a mobile station at a layer-2 logical layer.

An improved paging mechanism that overcomes the inadequacies of the existing paging mechanisms is therefore needed.

It is light of this background information related to the paging of a mobile station in a WLAN, or other radio communication system, that the significant improvements of the present invention have evolved.

SUMMARY OF THE INVENTION

The present invention, accordingly, advantageously provides apparatus, and an associated method, by which to page a mobile station operable in a radio communication system, such as a WLAN (Wireless Local Area Network) that utilizes IEEE 802.11 operating protocols.

Through operation of an embodiment of the present invention, a manner is provided by which to perform paging at a logical layer beneath an IP (Internet Protocol), or other layer-3 logical layer.

In one aspect of the present invention, a tracking agent is provided that utilizes a tracking agent protocol. The tracking agent provides for an interface between a layer-3 paging and a layer-2 logical layer. The tracking agent operates to track the positioning of a mobile station in terms of the link layer, or layer-2, logical layer. When a mobile station is to be paged, the position, earlier ascertained by the tracking agent, of the mobile station is used to determine throughout which areas that the page is to be broadcast. And, layer-2 paging is performed throughout an area encompassed by the area in which the tracking agent tracks the mobile station to have been positioned.

In another aspect of the present invention, a new link layer paging protocol is provided for IEEE 802.11 WLAN links. The link layer paging protocol is based upon tracking of the location of a mobile station with respect to an associated access point. That is to say, a mobile station is tracked with respect to an access point with which the mobile station is most recently associated. The new link layer paging protocol further generates pages that wake up a dormant mobile station utilizing a traffic indication map (TIM) information element of beacons generated by an access point that broadcasts the pages. Layer-3 and layer-2 logical layer paging areas are interfaced in manners permitting different paging algorithms to be used in the separate layer-3 and layer-2 paging areas. Furthermore, different paging protocols are to be utilized, thereby to enable the use of a mobile IP independent IP paging protocol to interact with the new layer-2 logical layer paging protocol.

In another aspect of the present, the tracking agent is embodied, logically, just above a boundary between a layer-2 logical layer and a layer-3 logical layer. The tracking agent tracks logical layer-2 mobility. In an exemplary implementation, a tracking agent is associated with, i.e., attached to, an access router (AR) that forms a portion of the network part of the WLAN. The tracking agent includes a paging cache at which the tracked locations of the mobile station are cached.

When a communication session is to be initiated, a layer-3 logical layer triggering entity receives a communication initiation request. Responsive to reception of the communication initiation request, the cache is accessed to obtain an indication of the layer-2 positioning of the mobile station. And, the retrieved indication is utilized at the layer-2 logical layer to broadcast the page throughout the layer-2 logical area at which the mobile station is indicated to be positioned.

Various advantages are provided through the layer 2 logical layer paging. Guaranteed paging of the mobile station is achievable. Unlike existing layer 3 paging algorithms, paging carried out pursuant to operation of an embodiment of the present invention, is able to track layer-2 logical layer parameters. Additionally, because the paging is carried out the layer-2 logical layer, paging latency is reduced. And, also, due to finer paging granularity, the efficiency of the mobile station is improved.

In these and other aspects, therefore, apparatus, and an associated method, is provided for a radio communication system. The radio communication system has a network part and at least a first mobile station with which a communication session is effectable by way of a network part. The network part is defined in terms of logical layers including a first logical layer and at least a second logical layer positioned thereabove. Paging of the mobile station is facilitated. A tracking agent is embodied at the second logical layer. The tracking agent tracks positioning of the mobile station. The positioning of the mobile station is tracked in terms of a first logical layer paging area. And, the tracking agent caches indications of the positioning of the mobile station. The indications cached by the tracking agent are retrievable to perform paging of the mobile station. The paging of the mobile station is at least initially performed in areas associated with the positioning of the mobile station, the indications of which are retrieved to perform the paging thereof.

A more complete appreciation of the present invention and the scope thereof can be obtained from the accompanying drawings that are briefly summarized below, the following detailed description of the presently preferred embodiments of the invention, and the appended claims.

DETAILED DESCRIPTION

Figure 1:
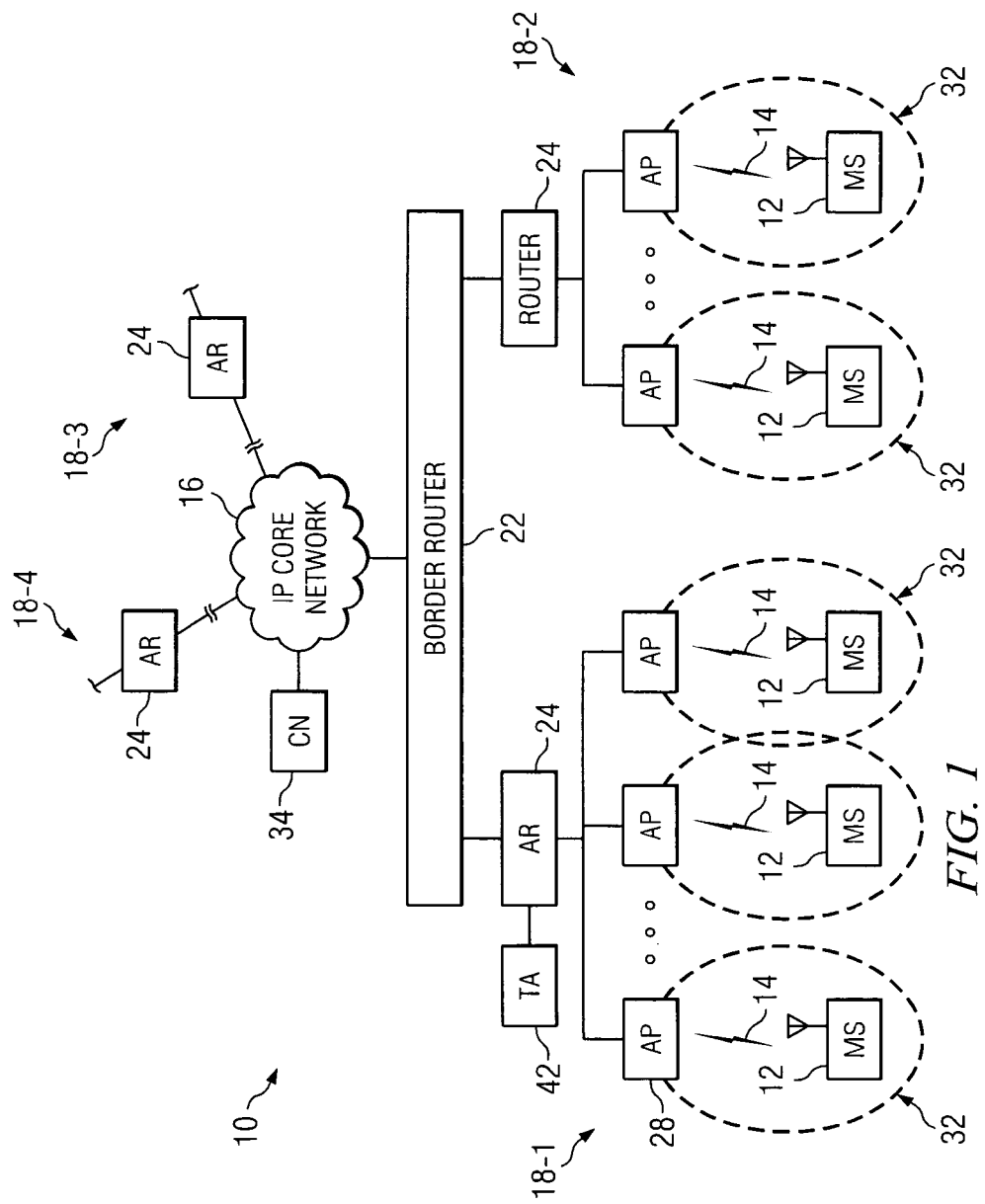
FIG. 1 illustrates a functional block diagram of a communication system in which an embodiment of the present invention forms a portion.

Referring first to FIG. 1, a communication system, shown generally at 10, operates to communicate packet-formatted data with mobile stations, of which the mobile station 12 is representative. The packet-formatted data is communicated with the mobile station by way of radio links, here represented at 14, defined upon a radio air interface extending between the mobile station and a network part of the communication system. In the exemplary implementation, portions of the communication system are operable pursuant to the operating parameters of a variant of the IEEE 802.11 operating standard. Such portions of the communication system, here form a WLAN (Wireless Local Area Network). While the following description shall be described with respect to the exemplary implementation in which portions of the communication system form a WLAN operable pursuant to the operating parameters of the variant of the IEEE 802.11 operating specification, it should be understood that the teachings of the present invention can analogously be implemented in various other types of packet-based, and other, radio communication systems. And, while the communication system, and the elements portions thereof, are functionally represented, the functional elements shown here to form the communication system, can be implemented in any desired manner, i.e., not only as-shown, but also in other manners.

The communication system 10 includes a core IP (Internet Protocol) network 16 to which logical sub networks 18 are connected. The sub network 18-1 forms the WLAN that operates pursuant to the variant of the IEEE 802.11 operating protocol. Others of the sub networks are operable pursuant to the same operating specification or form other types of radio networks. Here, for purposes of example, the sub network 18-2 also forms a WLAN, also operable pursuant to the IEEE 802.11 operating specification. The WLAN formed of the sub network 18-1 is connected, by way of a border router (BR) 22. Other access routers 24 are embodied and define other sub networks 18 of the communication system.

The WLAN formed of the sub network 18-1 further includes a plurality of access points (APs) 28. Each of the access points defines an area 32, herein referred to as a paging area or cell. When the mobile station 12 is positioned within a paging area defined by one of the access points, the mobile station generally communicates with the associated access point. And, pages, and other messages, broadcast by an access point throughout its associated paging area are detectable by the mobile station. Due to the inherent mobility of the mobile station, the mobile station is moveable, or otherwise repositionable, in a paging area encompassed by successive ones of the access points. When the mobile station exits the paging area defined by one of the access points and enters the paging area encompassed by another of the access points, an association procedure is performed with the new access point, and the mobile station de-associates itself from the prior access point. Continued communications with the mobile station, such as pursuant to a communication session, are permitted.

When a communication session is initiated, such as, for example, by a correspondent node (CN) 34, a call request is routed to the sub network at which the mobile station is believed to be located. Once delivered to the sub network, the call request must be broadcast to alert the mobile station of the call request. As mentioned previously, the mobile station is selectably operable in an active mode and a dormant mode. In conventional practice, the paging mechanism by which the mobile station is paged to alert the mobile station request to initiate the communication session therewith is sometimes not detected when the mobile station is in the dormant mode. More particularly, the conventional paging mechanism is an IP paging mechanism, carried out at an IP layer, i.e., a layer-3 logical layer. Not only is a dormant mobile station unable to detect such a page, but, also, the granularity of paging at the layer-3 logical layer is limited to a logical layer-3 paging area.

Pursuant to an embodiment of the present invention, a tracking agent (TA) 42 is provided. The tracking agent provides for link layer, i.e., layer-2 logical layer tracking of the mobile station. The tracked position of the mobile station is used pursuant to link layer paging operations by which to page the mobile station of the call initiation request. And, because the paging is performed at the link layer, the paging can be carried out in a manner to facilitate detection of the page by the mobile station even when the mobile station is in the dormant mode. Operation of an embodiment of the present invention further, therefore, provides a link layer paging protocol for IEEE 802.11 compliant WLANs. The paging protocol is based upon tracking by the tracking agent of with which access point of the sub network at which the mobile station has most recently been associated. The paging is carried out through use a traffic indication map (TIM) information element of beacons generated and broadcast by the access points 28. As shall be described hereinbelow, interaction between the layer-3 and layer-2 logical layer paging areas is provided. Modularity is provided so that different paging algorithms can be used in the paging areas defined by the separate logical layers.

Figure 2:
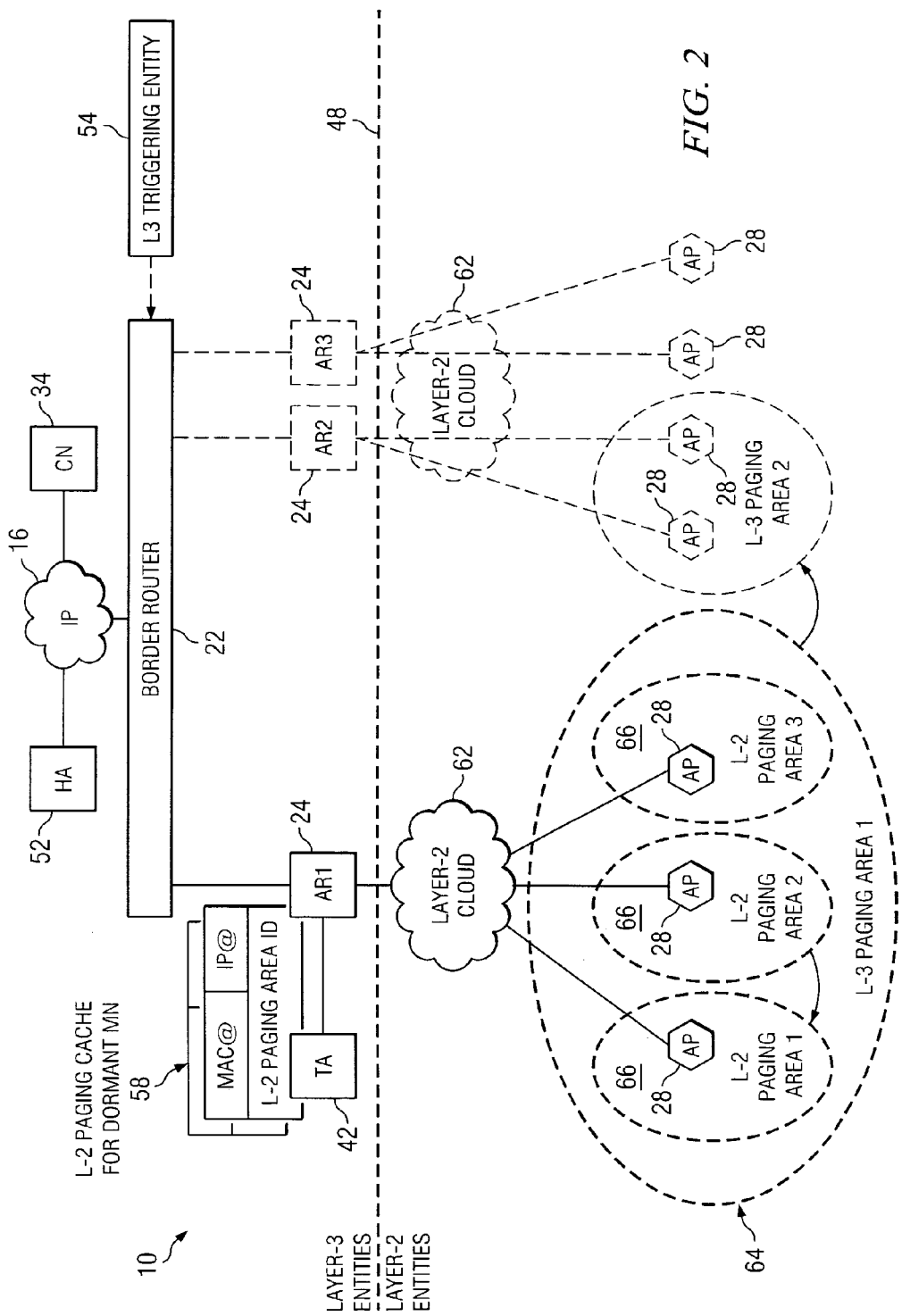
FIG. 2 another representation of portions of the communication system shown in FIG. 1.

FIG. 2 illustrates portions of the communication system 10, here representing the illustrated portions of the communication system in terms of logical layers. Entities positioned above (as shown) the line 48 layer-3 logical layer entities. And, entities positioned below (as shown) the line 48 form layer-2 logical layer entities.

The core IP network 16, the border router 22, and the access routers 24 are all shown to form layer-3 logical layer entities. The correspondent node 34 is also again shown at the layer-3 logical layer, and a home agent (HA) 52 and a layer-3 (L3) triggering entity 54 are also shown to form portions of the layer-3 logical layer. The tracking agent 42 is also shown to form a layer-3 logical layer entity. During operation of the tracking agent, entries are created and stored in a paging cache 58. Layer-2 paging area identities, MAC (medium access control), internet protocol (IP) addresses are representative of the information obtained and cached at the page cache.

Layer-2 logical layer entities are here shown to include access points (APs) 28. The access points are coupled to an associated access router 24 by layer-2 entities, designated by the clouds 62. The access points of three sub networks, such as the sub networks 18-1, 18-2, and 18-3 (shown in FIG. 1) are represented in Figure. Layer-3 paging areas, designated at 64, are also shown in the Figures. The layer-3 paging area 64 encompasses the layer-2 paging areas 66 of the entire sub networks of the sub networks with which the paging areas 64 are associated. The Figure illustrates, graphically, the improved granularity provided by the layer-2 paging areas, in contrast to the layer-3 paging areas.

The tracking agent 42 is embodied just above the layer-2 logical layer boundary in the third logical layer. The tracking agent functions to be responsible for layer-2 logical layer mobility. The layer-2 cloud entities 62 are representative, for instance, of a layer-2 medium access control (MAC) layer. While a single tracking agent 42 is shown in the Figure, in the exemplary implementation, separate tracking agent entities are associated with each access router defining each sub network that forms a WLAN in the communication system. During its operation, the tracking agent identifies the layer-2 paging area in which a mobile station is last-associated. The paging area in which a dormant node is last associated is also maintained in the paging cache. Updates to the entries are made when detection is made of movement of a mobile station between paging areas. In the exemplary implementation, the entries expire after a selected time out period. The tracking agent, and its protocol, provides both for tracking mobile stations and for paging the mobile station when a call request is delivered from a paging agent.

Tracking of a mobile station includes identifying both the initial position of the mobile station, buffering the tracked location of the mobile station in the paging cache, and updating the location of the mobile station when the mobile station becomes associated with another access point and its associated paging area. The tracking agent is notified of any association of the mobile station, or re-association of the mobile station with an access point by way of an IAPP (Inter Access Point Protocol) protocol. And access point sends an ADD-Notify IAPP message to make notification of the handoff of the mobile station to a new access point. The source address of the ADD-Notify message packet is the IP address of the access point. And, the ADD-Notify packet message also includes the MAC address of the mobile station. The destination address of the ADD-Notify packet is the IAPP IP multicast address. An access router 24 becomes a member of the multicast group that enables the access router to receive all ADD-Notify packets in the domain space that it encompasses. The tracking agent 42 associated with the access router creates a new record in the paging cache 58 if the MAC address is not already contained in the paging cache. Otherwise, the tracking agent updates the existing entry with the IP address of the new access point with which the mobile station is associated and in whose paging area that the mobile station is positioned. When the mobile station becomes associated with a particular access point, an IP address is assigned to the mobile station. The address is assigned, for instance, through the use of a stateful address configuration using DHCP. The access router is aware of the address, and the tracking agent modifies the paging cache entry of the mobile station accordingly.

Figure 3:
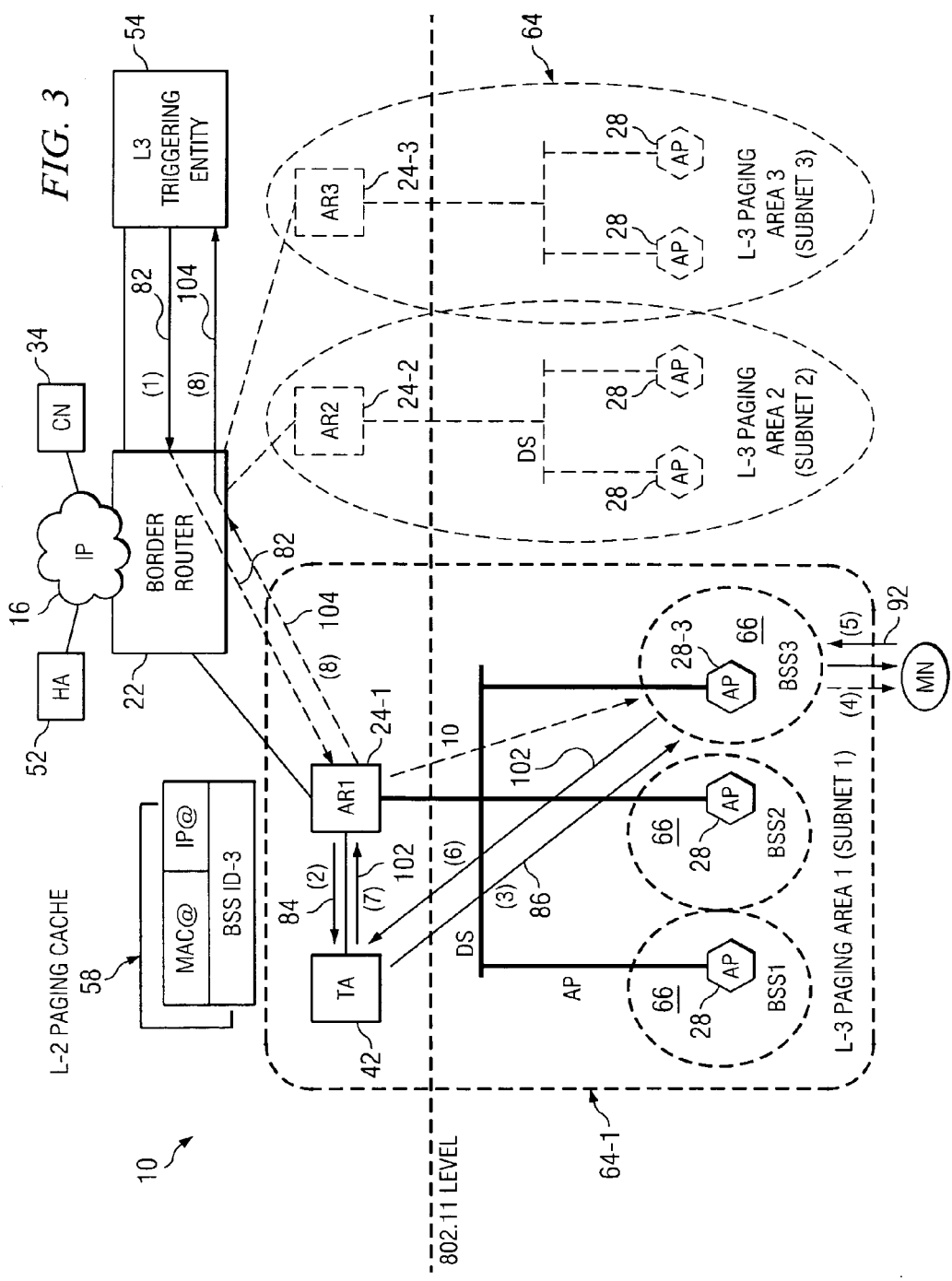
FIG. 3 illustrates a representation, similar to that shown in FIG. 2, here also illustrating signaling generated during operation of the communication system.

FIG. 3 also illustrates portions of the communication system in which the tracking agent 42 and paging 58 of the apparatus 60 form portions. And, again, the architecture, defined in terms of layer-3 and layer-2 entities of the communication system are shown. The reference numerals used in the prior Figures to identify the various elements of the communication system are again utilized. Signaling generated pursuant to implementation of a communication session is shown. The TAP (Tracking Agent Protocol) is triggered at the layer-3 logical layer, here when the triggering entity 54 receives a packet from the correspondent node 34 destined for delivery to a mobile station 12. The triggering entity includes a binding cache (not shown) in which here the dormant mode flag associated therewith is set. The access router communicates with access points to search for the location of the mobile station through the use of layer-2 logical layer paging request and response messages. The layer-2 logical layer paging request and response messages are IAPP commands, formatted according to IAPP formats.

As indicated by the segment 82, the triggering entity sends a paging request. The paging request is communicated, by way of the border router, to the access router 24-1 that defines a layer-2 paging area 64-1. The access router sends a paging request message, here indicated at the segment 84 to the tracking agent 42. The tracking agent determines, such as by accessing the cache, the paging area in which the mobile station is most recently positioned. And, the tracking agent sends a paging request message, here indicated by the segment 86, to the access point, here the access point 28-3 at which the paging cache indicates the mobile station most recently to have been positioned. The paging request message utilizes the IP address of the access point. The access point 28 receives this layer-2 logical layer page request. And, responsive thereto, the access point sets a corresponding bit in the TIM packet to the association ID (AID) of the mobile station and commences with broadcasts of the TIM.

When the mobile station is positioned to detect the broadcast message 90, the mobile station detects the message and responds to the paging request through the generation of a PS-control frame, indicated by the segment 92. The access point, in turn, sends a paging request data frame to the mobile station. The mobile station determines whether its address is in the data frame. If so, the mobile station enters the active mode in the layer-3 logical layer and follows IP protocol procedures thereafter. For instance, the mobile station makes an MIP (Mobile Internet Protocol) registration. The registration is indicated in the Figure by the segment 94.

Then, the access point informs, indicated by the segment 98, of the registration. Then, and as indicated by the segment 102, the tracking agents sends the result of the paging operations to the access router. And, the access router forwards on the message, indicated by the segment 104, through the border router to the triggering entity. If the tracking agent is unsuccessful in its first paging attempt, then the tracking agent pages the mobile station in all of the paging areas within the sub net defined by the access router 28-1. If paging is successful, the access router is informed and the signaling just-described continues. If the subsequent paging is unsuccessful, the tracking agent informs the access router and the access router, in turn, informs the third logical layer of the unsuccessful paging operations. Then, layer three logical layer paging commences.

The protocol is triggered as just-described by a layer-3 triggering entity. The layer-3 triggering entity is any selected device. Therefore, the tracking agent protocol is triggered by any layer-3 methodology, such as hierarchical, mobile Ipv6, home agent paging, 3G UMTS paging, SIP server operations, etc.

Thereby, through operation of an embodiment of the present invention, guaranteed paging is achieved. That is to say, paging of a mobile station, even when the mobile station is in a dormant mode, is provided. And, because the paging is performed at the lower logical layer, paging latency is smaller than existing paging algorithms. Additionally, due to the finer paging granularity, more efficient paging operations are performed. Fewer numbers of stations are paged by permitting the paging to be effectuated at the lower logical layer.

The previous descriptions are of preferred examples for implementing the invention, and the scope of the invention should not necessarily be limited by this description. The scope of the present invention is defined by the following claims:

We claim:

1. In a radio communication system having a network part and at least a first mobile station with which a communication session is effectuable by way of the network part, the network part defined in terms of logical layers including a lower logical layer and at least a higher logical layer positioned thereabove, an improvement of apparatus for facilitating paging of the mobile station, said apparatus comprising:

a tracking agent embodied at the higher logical layer, said tracking agent for tracking positioning of the mobile station, the mobile station moveable within a hierarchical paging area including lower-logical-layer paging areas associated with said lower logical layer and higher-logical-layer paging areas associated with said higher logical layer, said tracking agent further for tracking in which of the lower and higher-logical-layer paging areas that the mobile station is positioned and for caching indications of the positioning of the mobile station, the indications cached by said tracking agent retrievable to perform paging of the mobile station, the paging at least initially performed in areas associated with the positioning of the mobile station.

2. The apparatus of claim 1 further comprising a page message generator embodied at the lower logical layer and coupled to said tracking agent, said page message generator selectably for generating a page message for broadcast at least in the areas associated with the positioning of the mobile station indicated by the indications cached by said tracking agent.

3. The apparatus of claim 1 wherein the radio communication system comprises an access router embodied at the higher logical layer and wherein said tracking agent is attached to the access router.

4. The apparatus of claim 3 wherein the radio communication system comprises a first access point that defines a first lower-logical-layer paging area and at least a second access point that defines at least a second lower-logical-layer paging area, the mobile station moveable between the first and at least second lower-logical layer paging areas, respectively, and said tracking agent further for tracking in which of the first and at least second lower-logical layer that the mobile station is positioned.

5. The apparatus of claim 4 wherein the indications cached by said tracking agent are updated when the mobile station exits one of the first and at least second lower-logical-layer paging areas and enters another one of the first and at least second lower-logical-layer paging areas.

6. The apparatus of claim 5 wherein the positioning of the mobile station tracked by said tracking agent is determined responsive to values of messages communicated by the mobile station to the network part.

7. The apparatus of claim 6 wherein the mobile station associates with a selected one of the first access point and the at least the second access point into whose lower logical layer paging area that the mobile station enters, and wherein the messages communicated to the network part by the mobile station are communicated pursuant to association of the mobile station with the selected one of the first and at least second access points.

8. The apparatus of claim 7 wherein the selected one of the first and at least second access points detects the messages communicated to the network part by the mobile station and, responsive thereto, forms an IAPP-formatted (Inter Access Point Protocol-formatted) message, and forwards the IAPP-formatted message to the access router to which said tracking agent is attached.

9. The apparatus of claim 8 wherein the selected one of the first and at least second access points is identified by an Internet Protocol (IP) address and wherein the IAPP-formatted message comprises values representative of the Internet Protocol address of the selected one of the first and at least second access points.

10. The apparatus of claim 8 wherein the mobile station is identified by a Medium Access Protocol address and wherein the IAPP-formatted message comprises values representative of the Medium Access Protocol address of the mobile station.

11. The apparatus of claim 2 wherein the radio communication system further comprises a correspondent node that initiates the communication session, the correspondent node having at least a portion embodied at the higher logical layer, the correspondent node forming a higher-logical-layer triggering entity that triggers paging of the mobile station by said page message generator.

12. The apparatus of claim 11 wherein the page message generated by said page message generator forms an IAPP-formatted (Inter Access Point Protocol-formatted) message, the IAPP-formatted message forming a lower-logical-layer message.

13. The apparatus of claim 12 wherein the IAPP-formatted message comprises a TIM (Transfer Information Message) message packet.

14. The apparatus of claim 13 wherein said message generator broadcasts the TIM message packet during up to at least a selected number of TIM intervals.

15. In a method of communicating in a radio communication system having a network part and at least a first mobile station with which a communication session is effectuable by way of the network part, the network part defined in terms of logical layers including a lower logical layer and at least a higher logical layer positioned thereabove, an improvement of a method for facilitating paging of the mobile station, said method comprising:

providing a hierarchical paging area including lower-logical-layer paging areas associated with said lower logical layer and higher-logical-layer paging areas associated with said higher logical layer;

tracking, from the higher logical layer, positioning of the mobile station to identify in which of the lower and higher-logical-layer paging areas that the mobile station is positioned;

caching indications of the positioning of the mobile station tracked during said operation of tracking; and selectably paging the mobile station at least initially in areas associated with the lower-logical-layer positioning of me mobile station, indications of which are cached during said operation of caching.

16. The method of claim 15 wherein the radio communication system comprises a first access point that defines a first, lower-logical-layer paging area and at least a second access point that defines at least a second, lower-logical-layer paging area, wherein the mobile station is moveable between the first and at least second lower-logical-layer paging areas, and wherein said operation of tracking comprises tracking in which of the first and at least second lower-logical-layer paging areas in which the mobile station is positioned.

17. The method of claim 16 wherein the mobile station is paged during said operation of selectably paging upon initiation of a communication session, and wherein said method further comprises the operation, prior to said operation of selectably paging, of initiating the communication session from a higher-logical-layer correspondent node.

18. The method of claim 17 further comprising the operation, carried out at the higher logical layer, of accessing the indications cached during said operation of caching.

19. The method of claim 16 further comprising the operation, carried out by the mobile station, of acknowledging reception of pages sent during said operation of selectably paging.

20. The method of claim 19 further comprising the operation of additionally selectably paging in areas associated with the higher-logical-layer positioning of the mobile station, indications of which are cached during said operation of caching.

* * * * *

UNITED STATES PATENT AND TRADEMARK OFFICE
CERTIFICATE OF CORRECTION

PATENT NO. : 7,623,876 B2  Page 1 of 1
APPLICATION NO. : 10/640000
DATED : November 24, 2009
INVENTOR(S) : Sarikaya et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1784 days.

Signed and Sealed this

Fourteenth Day of December, 2010

David J. Kappos
*Director of the United States Patent and Trademark Office*